US009228851B2

(12) United States Patent
Lobato Fregoso et al.

(10) Patent No.: US 9,228,851 B2
(45) Date of Patent: Jan. 5, 2016

(54) DISPLAY OF ESTIMATED TIME TO ARRIVAL AT UPCOMING PERSONALIZED ROUTE WAYPOINTS

(71) Applicants: VOLKSWAGEN AG, Wolfsburg (DE); AUDI AG, Ingolstadt (DE)

(72) Inventors: Marco Antonio Lobato Fregoso, San Francisco, CA (US); Karric Kwong, Emeryville, CA (US); Heiko Maiwand, Foster City, CA (US)

(73) Assignees: VOLKSWAGEN AG, Wolfsburg (DE); AUDI AG, Ingolstadt (DE)

( * ) Notice: Subject to any disclaimer, the term of this patent is extended or adjusted under 35 U.S.C. 154(b) by 0 days.

(21) Appl. No.: 14/186,815

(22) Filed: Feb. 21, 2014

(65) Prior Publication Data
US 2015/0241235 A1     Aug. 27, 2015

(51) Int. Cl.
*G01C 21/36*     (2006.01)
(52) U.S. Cl.
CPC ............ *G01C 21/36* (2013.01); *G01C 21/3697* (2013.01)

(58) Field of Classification Search
None
See application file for complete search history.

(56) References Cited

U.S. PATENT DOCUMENTS

| 6,826,472 | B1 * | 11/2004 | Kamei et al. | 701/426 |
| 2004/0128066 | A1 * | 7/2004 | Kudo et al. | 701/204 |
| 2004/0172192 | A1 * | 9/2004 | Knutson | 701/208 |
| 2005/0071078 | A1 * | 3/2005 | Yamada et al. | 701/201 |
| 2005/0096842 | A1 * | 5/2005 | Tashiro | 701/210 |
| 2010/0268460 | A1 | 10/2010 | Wan et al. | |
| 2012/0113138 | A1 * | 5/2012 | Uusitalo et al. | 345/629 |

FOREIGN PATENT DOCUMENTS

| WO | 2007067842 A2 | 6/2007 |
| WO | 2007103123 A2 | 9/2007 |

* cited by examiner

*Primary Examiner* — James Trammell
*Assistant Examiner* — Adam Mott
(74) *Attorney, Agent, or Firm* — Barnes & Thornburg LLP

(57) ABSTRACT

An in-vehicle system and method for selecting and displaying on a roadmap upcoming waypoints and associated information, including an estimated time to arrival at the waypoints. In an embodiment, driving history is stored and analyzed, including routes taken and previous destinations, and used to determine and display personalized waypoints.

45 Claims, 8 Drawing Sheets

DISPLAY OF ESTIMATED TIME TO ARRIVAL AT UPCOMING PERSONALIZED ROUTE WAYPOINTS

BACKGROUND

The present disclosure relates to a system, components, and methodologies for displaying the estimated time to arrival at one or more upcoming waypoints while traveling in a vehicle. In particular, the present disclosure is directed to a system, components, and methodologies that enable in-vehicle dynamic display of upcoming waypoints based on the vehicle's location and direction of travel on a road being traversed, known general points of interest ahead, and dynamically acquired previously visited locations ahead.

Current navigation systems provide real-time traffic incident information to the driver regarding driving conditions ahead, such as average roadway speeds, accidents, road construction, road closures, and the like. Such information may give the driver a better sense of what to expect for their current trip. One particular aspect of this is the Estimated Time to Arrival (ETA) at one or more waypoints along a route being travelled. In the prior art, ETA information is available only to a destination specifically identified by a driver, and only when the vehicle's route guidance system is active. But when no destination is identified, and/or if the navigation system is not active for route guidance, a driver cannot easily obtain a sense of the driving time or distance to upcoming landmarks, previously visited destinations, and/or other waypoints.

In conventional prior art navigation systems, the vehicle's position and direction of travel may be determined, for example, by a global positioning system (GPS) terminal or the like. However, if no destination has been entered, no ETA or distance information is shown. Instead, the driver must estimate the vehicle's position in relation to known landmarks, and estimate the time to arrival to known points of interest ahead using whatever speed and upcoming traffic incident information may be available. For example, the distance to a known point of interest may be estimated from the displayed roadmap, speed may be obtained from a speedometer, and traffic conditions may be obtained from a local broadcast radio station traffic report, or as may be provided by the navigation system.

In conventional navigation systems, a driver may also encounter an occasional roadway dynamic message sign, which may provide estimated travel times to one or more upcoming waypoints. However, such message signs are not constantly available to enhance a driver's awareness of upcoming waypoints. Moreover, such message signs do not vary the selection of information displayed based on any particular driver.

It would be helpful to present to a driver information similar to that displayed on such roadway signs, by which a driver could obtain ETA information to upcoming landmarks or other waypoints, without having to input a particular destination into a route guidance system, and without a route guidance system even being active. It would also be helpful if the ETA to easily identifiable upcoming waypoints could be conveyed to the driver in a manner that does not distract the driver's attention from the road ahead, for example when travelling in unfamiliar territory. It would also be helpful if personalized information pertaining to previously visited or identified waypoints and/or destinations could be saved, and to present the ETA to such locations on subsequent travels as waypoints. Further, it would be helpful to update such information and its presentation in real-time, based on the current driving situation.

SUMMARY

According to the present disclosure, a system is provided that presents on a display a roadmap that indicates upcoming waypoints while traveling, and presents information such as the ETA and/or distance to the upcoming waypoints.

In illustrative embodiments, an in-vehicle personalized upcoming waypoint presentation system comprises a processor in data communication with a graphical display device, a transceiver arranged to communicate with sources of mapping and well-known waypoint information, a GPS module, and a route profile storage device for storing previously traveled routes and destinations. A map database stores roadway information and information of general points of interest, such as busy intersections, institutions, museums, bridges, entrance and exit ramps of limited access highways, airports, stadiums, and the like. A map display engine is provided that shows a roadmap of the area being traversed, and the location and direction of travel on a road on the roadmap and selects and displays information of upcoming waypoints. The map display engine is operative to analyze the available upcoming waypoint information in view of a current driving situation, and further in view of a driver's preferences and previous destinations, and present on the display the upcoming waypoints and associated information most likely to be of interest to the driver under the current circumstances.

In illustrative embodiments, a method of displaying upcoming waypoints comprises obtaining a location of a vehicle being driven on a road, a direction of travel, and a speed of travel; identifying and selecting upcoming waypoints; and presenting the vehicle's location and direction of travel, the select waypoints, and information associated with the select waypoints on a roadmap presented on a display device.

Additional features of the present disclosure will become apparent to those skilled in the art upon consideration of illustrative embodiments including the best mode of carrying out the disclosure as presently perceived.

BRIEF DESCRIPTION OF THE FIGURES

The detailed description makes reference to the accompanying figures in which.

DETAILED DESCRIPTION

Figure 1:
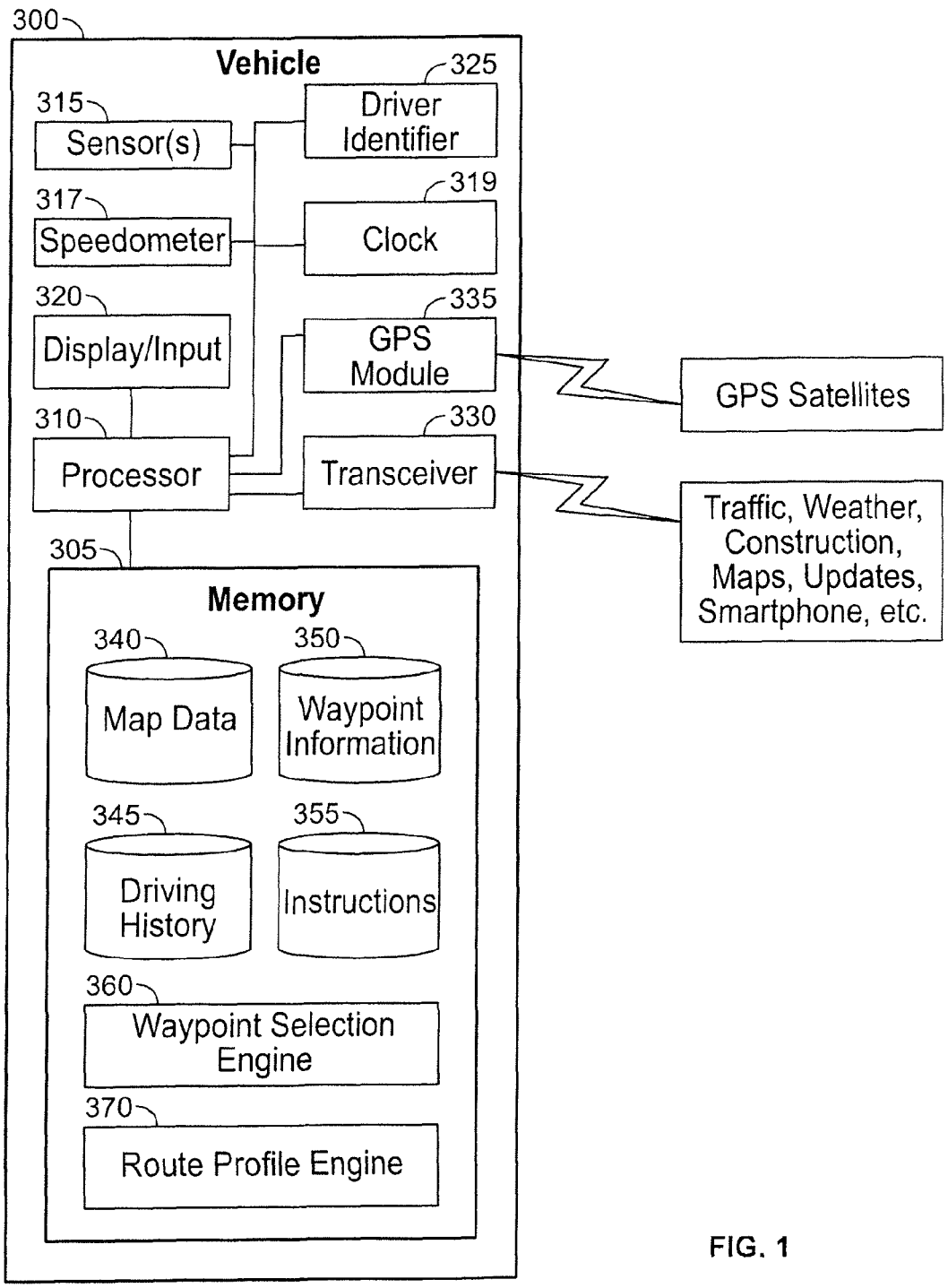
FIG. 1 is a simplified block diagram of an exemplary system for presenting upcoming waypoints and associated information, in accordance with the disclosure.

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

A certain geographic location awareness of one's surroundings is provided simply by looking at a map, assuming one's present location can be found on the map. However in a driving situation, even if a map is presented with a current location indicated, for example, on a display of a head unit of the vehicle that has navigation capabilities, a driver must focus on the road ahead and cannot maintain attention both on the map and on the physical surroundings. In the prior art, vehicle-based navigation systems are known that accept a destination identity from a driver, calculate a route to the destination from the present location to the destination using location information obtained from a GPS module, and provide auditory guidance to the destination, such as by a synthesized voice. A listing of turning points and distances between them may also be provided, and the route to the destination may be plotted on a roadmap display and updated in real time to show progress toward the destination while driving. Further, prior art systems may also visually represent local traffic conditions, such as by overlaying mapped roadways with color coded lines representing current traffic conditions in certain sections of the roadway, for example. Directionality of traffic congestion may also be conveyed by the placement of the overlaid line relative to the road, for example, to the left or right of the line representing the road. Additional traffic incident icons may be placed on the map to show locations of accidents and the like.

However, if a driver is traversing unknown territory and/or has no identifiable local destination, it may nevertheless be helpful to the driver to know what waypoints are upcoming in the direction of travel, how far away they are, and/or how long it is likely to take to reach them. Moreover, prior art systems do not detect or present personalized waypoints based on historic driving patterns of the driver, to help the driver more fully appreciate current surroundings based on the current context. In particular, prior art navigation systems provide an estimated time of arrival only when route guidance is active, and only if the intended destination is input into the system by the user. The arrival time may be displayed as text, for example in a reserved portion of the main roadmap display, or on a secondary display.

It would be helpful if a system would identify and keep track of the various destinations visited by a driver as they are visited over time, and use the information to provide additional geographic awareness based on prior travels in an area. Moreover, it would be helpful for a navigation system to dynamically select upcoming waypoints based on a current driving situation. For example, previous destinations may be identified in addition to or in place of waypoints of more general interest. Furthermore, a zoom level of an area presented on a displayed map may be modified based on speed, and waypoints may be selected for display that are appropriate to the zoom level. In addition, the condition of the driver and/or in the passenger cabin may be detected by sensors, and that information may be used to modify or adapt the selection and display of waypoints to those conditions.

The technical challenge is to provide a means for selecting and obtaining information of upcoming waypoints on the road ahead while traveling, obtain information regarding the waypoint display preferences of the driver, organize and present the upcoming waypoints and associated information in a format that is easy to understand by the driver, and adapt the selection and presentation of upcoming waypoints based on the current driving situation.

Disclosed embodiments provide a solution to the above-described technical problems by providing an in-vehicle system for obtaining information regarding upcoming waypoints, gathering information regarding previous destinations, location, speed of travel, travel conditions, and the driver or passenger cabin condition and the like from a plurality of sources, analyzing these data, and selecting and displaying information of upcoming waypoints most likely to be of interest to the driver in the current driving situation, without a driver having to provide a destination or a navigation system having to be active that would calculate a route to such a destination.

FIG. 1 is a simplified block diagram of a vehicle system 300 for presenting information of upcoming waypoints to a driver of the vehicle, and for dynamically selecting waypoints most likely to be of interest to the driver under the present circumstances. System 300 is controlled primarily by computer readable instructions, which may be in the form of software instructions stored on a tangible data storage device 305 (hereinafter "memory"), such as a magnetic disk hard drive, solid state drive, optical disk, and/or high-speed read only memory (ROM), random access memory (RAM) or the like. In an embodiment, RAM may temporarily store instructions and data retrieved from slower storage devices as needed for current operations, from which they can be more quickly read and processed by the processor or other hardware devices.

The instructions may be executed by a tangible processor 310, such as a microprocessor, to cause system 300 to perform tasks. In operation, processor 310 fetches and executes instructions and information, and generates and transfers information to and from other resources coupled to or in data communication with the processor.

In addition, system 300 may contain one or more sensors 315, such as a motion sensor and/or camera arranged to detect driver movements, hand gestures, and the like, and/or one or more microphones to detect verbalizations and other sounds from the driver and/or the noise level in the passenger compartment, for example. An accessible speedometer 317 provides vehicle speed information. A clock 319 may be included for determining time-based information, such as a time of day, a duration, a day of the week, etc. System 300 may also contain display device 320 to present visual output generated by the processor or a display controller. Such output may include a roadmap with a vehicle position indicator, and may include or be overlaid with text, graphics, and video, for example. Display 320 may be implemented with an LCD-based touch sensitive flat-panel display operable to receive input such as driver selections, text on a virtual keyboard, or the like. Alternative or additional input and output devices may also be included, such as a microphone and speech recognition software for receiving verbal input, a speaker and speech producing software for providing output, and the like.

System 300 may include a transceiver module 330 operative to obtain information from one or more remote sources, such as a weather service that broadcasts weather conditions and forecasts. The transceiver module may include, for example, a cellular transceiver in data communication with a cellular communication system (not shown). In addition, the transceiver module may be operative to establish a bluetooth, wife, near-field, or other data communication connection with the driver's smartphone (not shown) or the like. The transceiver module may also include broadcast radio receiver(s), such as an AM or FM receiver, for receiving traffic information or the like. A global positioning system (GPS) module 335 may be included in or be accessible to the system that is operable to determine a geographic position of the vehicle, such as by communicating with a plurality of GPS satellites and triangulating the vehicle's location based on the satellites' positions. The system may include or have access to stored roadmap data 340. Further, the system may be operable to correlate the vehicle position from GPS module 335 with the map data to show the vehicle's position on a roadmap.

Memory 305 may include one or more databases for storing information. In embodiments, the stored information may include map data, 340, driving history and/or driver information 345, waypoint information 350, and instructions 355 for performing tasks, as described herein. In an embodiment, certain instructions when executed on the processor, in combination with other information such as information stored in the memory, or obtained from one or more of the devices coupled to the processor, or the like, may implement waypoint selection engine 360, and route profile engine 370.

Waypoint selection engine 360 is operative to select upcoming waypoints for display on the roadmap while driving. Initially, only information of waypoints of general interest are available. Waypoints may be selected based on default settings of the system, or based on display preferences entered by the driver. For example, a default selection may include major intersections, airports, stadiums, and museums on the road ahead for display as upcoming waypoints. A driver may enter preferences removing airports and stadiums, and adding Zagat rated restaurants as waypoints for display, for example.

Route profile engine 370 may analyze and identify routes travelled and destinations visited by a driver over time. Such data collection may be performed passively. For example, even when the driver does not actively engage the navigation system by inputting a destination, route profile engine 370 may monitor where the car is driven and where it is parked, using data from GPS module 335 for example. By correlating GPS data obtained when the vehicle is being used with map data, personalized routes and destinations may be identified and stored. Data collection, storage, and analysis may begin with the first use of the vehicle. Identified destination information may then be used by waypoint selection engine 360 to customize the selection of waypoints for presentation to the driver.

In an embodiment, system 300 may include a driver identifier 325 for identifying the driver. The identifier may be or include a key fob or key containing electronics that have been identified in the system with a particular driver, a camera and face recognition software, a driver position setting control that identifies a select collection of settings with a driver, or the like. The driver identifier may be used to personalize aspects of the information presented on the display to one or more specifically identified drivers. The system may then begin gathering, storing, and analyzing data of a new driver's routes and destinations whenever the new driver is identified to the system. In doing so, the most recent driving history of each identified driver may be weighted more than data which is older, so that waypoint selections may reflect the most recent driving history. For example, a driver may take a new job in a different area, or develop a preference for different restaurants, or the like, which may affect the selection of waypoints to be displayed to that driver.

Waypoint selection may also be affected by such information as news of an event that may affect traffic such as a traffic accident, and/or scheduled road construction, or the like. In particular, the location of accidents, road construction, and the like may be selected as waypoints likely to be of interest to a driver.

In embodiments, system 300 may be included in a vehicle as original equipment, or may be included in or coupled to a vehicle's infotainment head unit (HU). Alternatively, system 300 may be embodied in a personal computing platform such as a smart phone or the like. Such a personal computing platform may operate independently of any vehicle-based system, and/or may be coupled to a vehicle-based system or HU by a wired or wireless connection, such as via a wired docking cradle, or a wireless Bluetooth, WiFi, or nearfield communications (NFC) connection.

Figure 2:
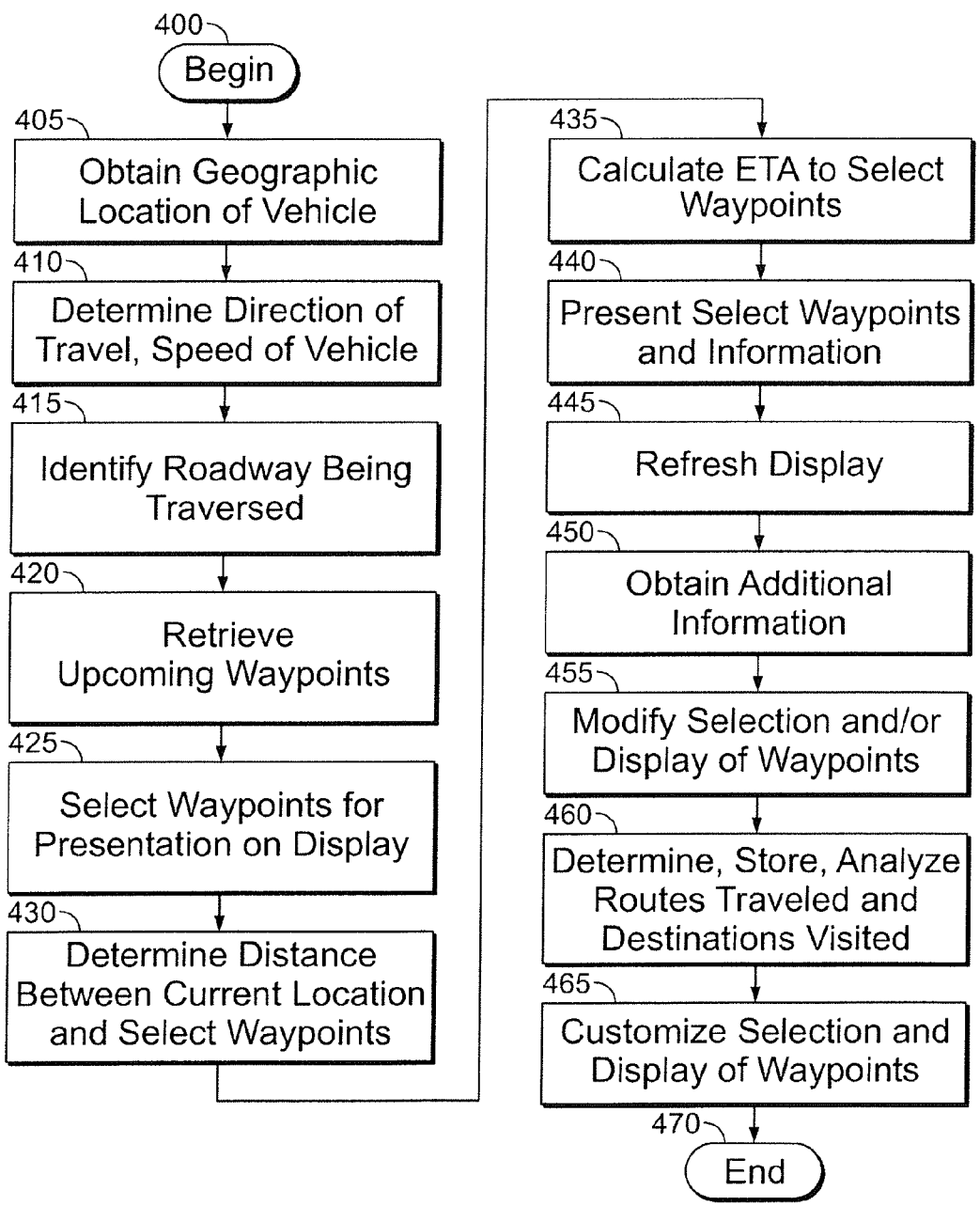
FIG. 2 is a block diagram of a method for presenting upcoming waypoints and associated information, such as might be performed by the system of FIG. 1, in accordance with the disclosure.

FIG. 2 is a flow diagram of an exemplary method for presenting information of upcoming waypoints while travelling. The method begins, 400, when the vehicle is started. The system obtains a geographic location of the vehicle, 405. The location may be obtained, for example, from a GPS module, although other location indicating systems may be used, such as triangulation based on cellular towers if a cellular radio is available to the system, or wifi access points is a wifi radio is available, or the like. At 410, the direction of travel of the vehicle is determined, for example using consecutive location points, or using a compass or other direction sensing device. The speed of the vehicle may also be obtained, such as from a speedometer of the vehicle, or estimated using consecutive location points and the time elapsed between them. At 415, the roadway being traversed is identified. Based on the roadway being traversed and the direction of travel, upcoming waypoints on the road ahead may be determined and retrieved from a database or the like that stores roadmaps and waypoints of general interest, 420.

The system selects particular waypoints to be presented on the display, 425. The driving distance between the current location and the selected waypoints is determined, 430, and the estimated travel time, that is, the estimated time to arrival (ETA) at the selected waypoints, is also determined, 435. In an embodiment, the current time may also be obtained from a clock, and the time of arrival at the selected waypoints may be calculated by adding the travel times to the current time. The selected waypoints and associated information may then be presented on the display, 440. For example, icons representing the selected waypoints may be overlaid on the roadmap, with a table listing the selected waypoints and one or more of the estimated travel time to or between each presented waypoint, the distance to or between each of the waypoints, and the estimated time of arrival at each of the waypoints.

As the vehicle traverses the roadway, the display is refreshed continuously or intermittently with updated, real-time information. Moreover, if the vehicle changes directions on the roadway by performing a u-turn, or turns onto a different roadway or the like, the system detects the change in heading, and finds and similarly selects and displays the waypoints that are now ahead and associated information.

In embodiments, the system may obtain additional information, 450, and may modify the selection and/or the display of waypoints, 455. For example, a map zoom factor and the selection of waypoints to be displayed may be adjusted based on a vehicle's current speed. In an embodiment, the displayed area roadmap may be automatically magnified if the roadway being traveled traverses an area zoned residential or commercial and the vehicle speed slows to a speed deemed by the system to indicate that the driver may be looking for a particular address. The waypoints selected may then be modified to include each upcoming intersection, and the display may be enhanced to show property lines and street addresses if they are publicly available, such as from a data source accessible by a wireless data connection for example. Conversely, a displayed roadmap can be zoomed out to show many miles of upcoming roadway when a vehicle enters a limited access highway and reaches highway speeds.

Figure 8:
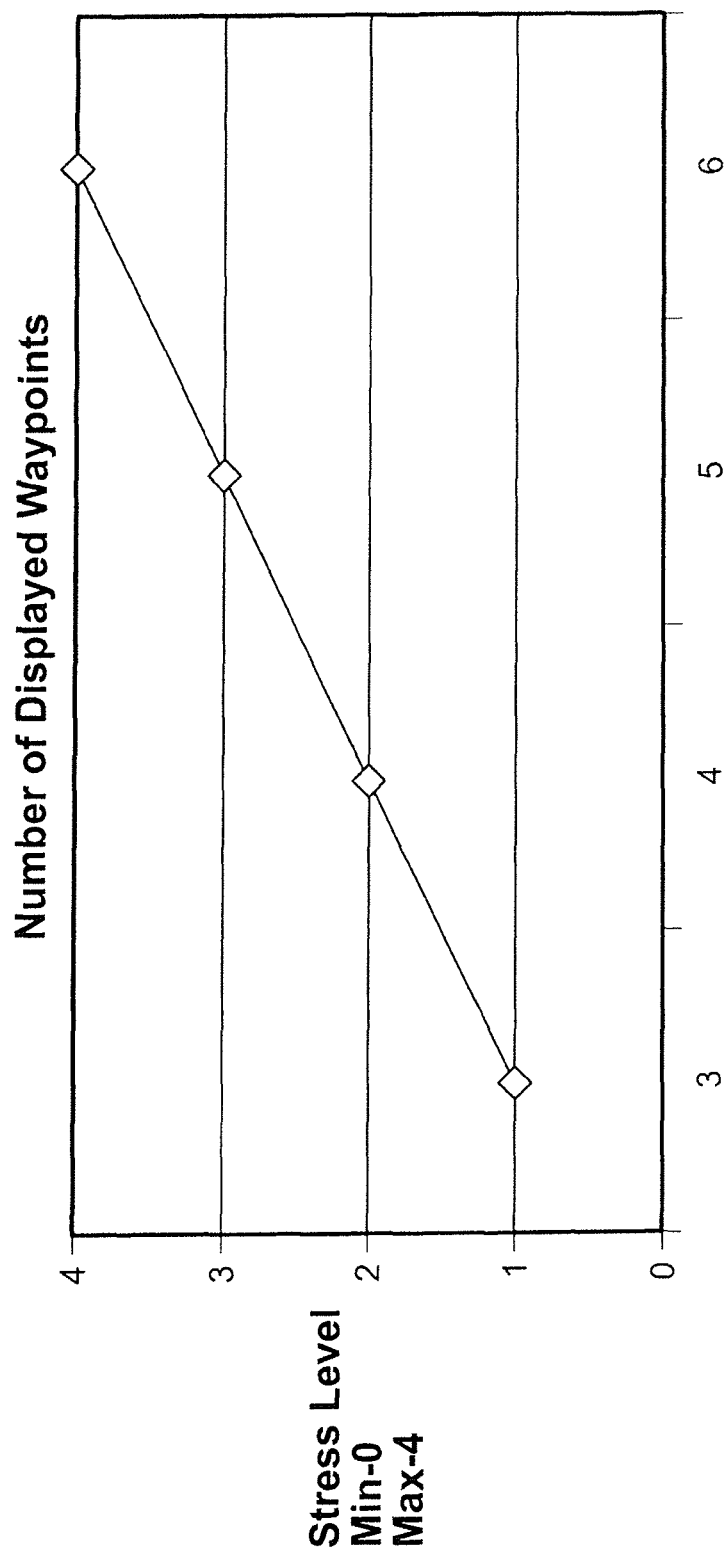
FIG. 8 is an illustration showing an exemplary basis for modifying the presentation of waypoints based on sensor-obtained biometric data of the driver, in accordance with the disclosure.

In addition, the selection and/or presentation of waypoints on a roadmap may be modified based on input from one or more sensors operative to obtain a driver's current state. For example, the detection by a motion sensor of a plurality of short, quick movements may be deemed to be indicative of driver agitation and stress level. The number of displayed waypoints may be modified accordingly. For example, FIG. 8 shows a graph correlating a detected driver stress level with a number of displayed waypoints. In addition or alternatively, sensors may be arranged to recognize hand gestures, and modify aspects of the roadmap and/or waypoints based on the gestures. Such a system may be trainable by a user to recognize gestures specific to the user. Conversely, the system may train a user to use standard gestures.

Returning now to FIG. 2, in an exemplary embodiment the system may autonomously and automatically determine, store, and analyze the various routes that have been traversed and destinations that have been visited over time, 460. The system may then automatically customize the selection and/or display of waypoints based on the prior routes and destinations, 465. The method may end, 470, when the vehicle is turned off, for example.

In an embodiment, a driver may input preferences for specific features of a preferred presentation of waypoint information. For example, the driver may prefer a certain number of waypoints to be displayed, or a certain average distance between them. The driver may have preferences regarding the icons used to identify certain waypoints on the roadmap, or the size of the icons relative to other map features, or have a preferred set among a plurality of stylistically distinguishable sets of icons provided by the system. The driver may also input preference information regarding the zoom level of the roadmap shown, that is, the distance ahead that may be displayed, and/or that may be displayed under certain identified conditions. Moreover, the driver may indicate a preference for one or more classes of waypoints, such as restaurants, or rest stops having toileting or other facilities. The system may store those preferences and search for such features in remotely stored databases to identify preferred waypoints for display, for example.

Figure 3:
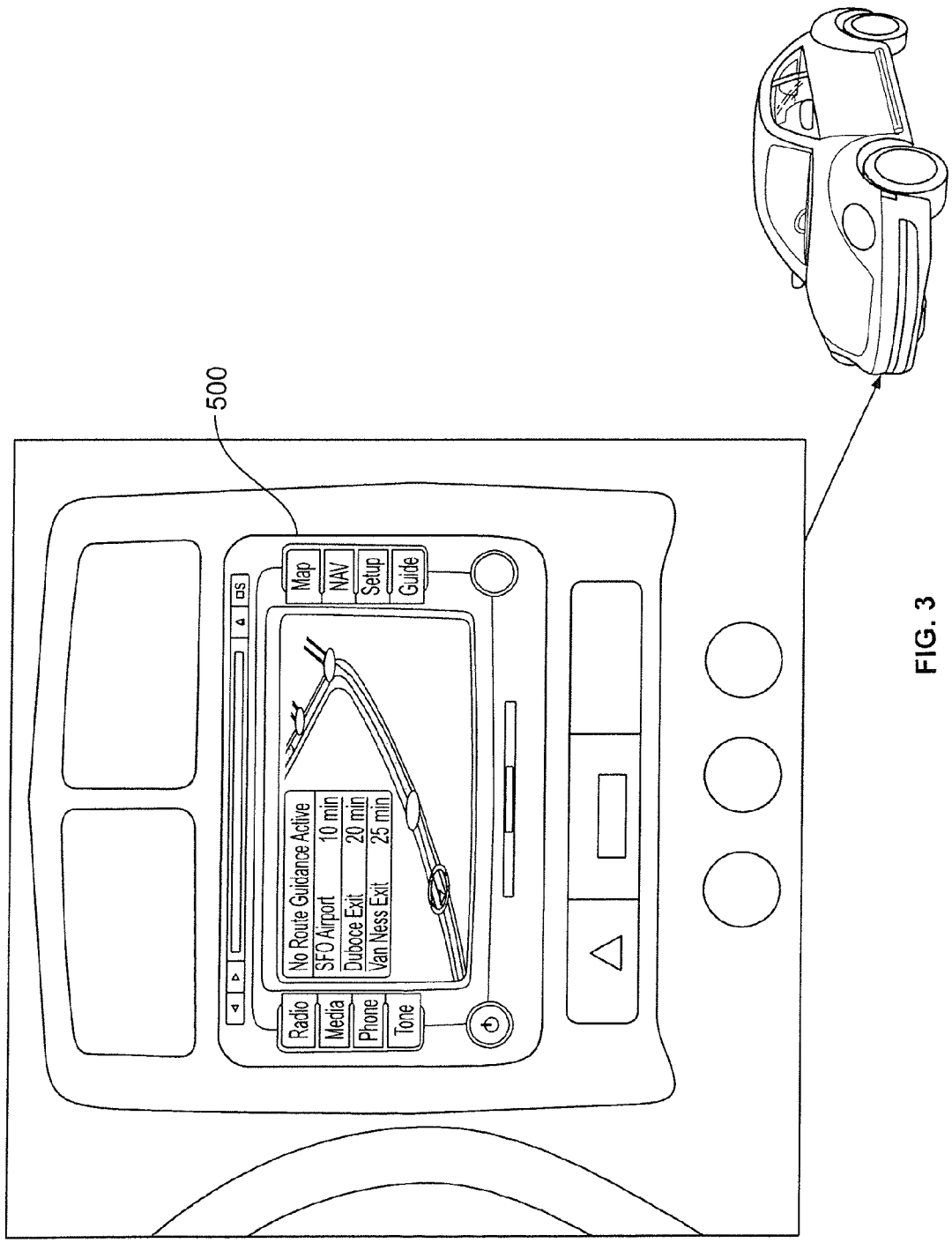
FIG. 3 illustrates an exemplary embodiment of the disclosed system in a head unit of a vehicle.
Figure 4:
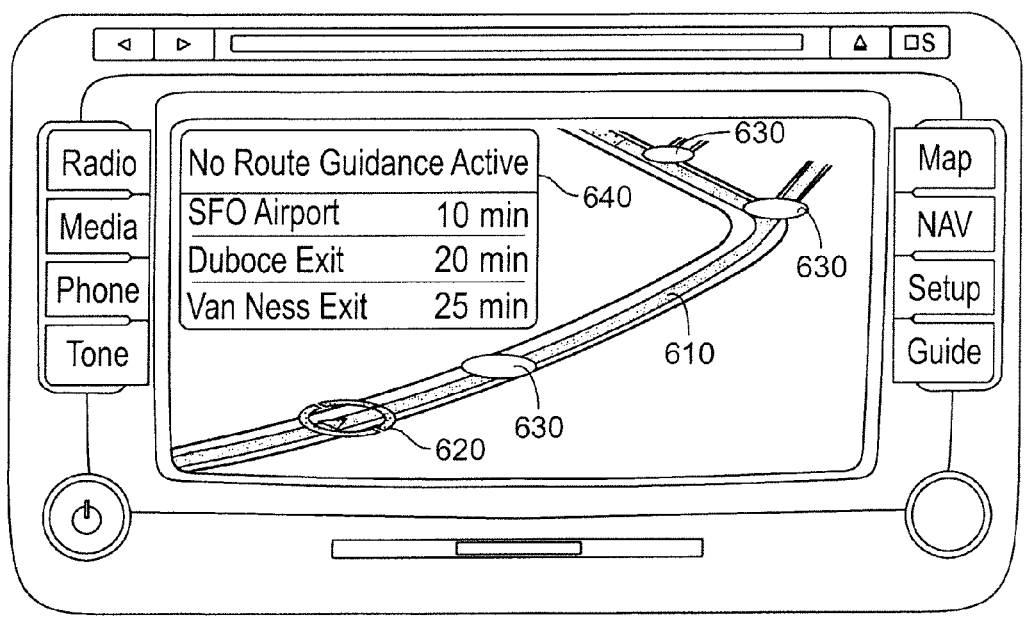
FIG. 4 is a detailed view of an exemplary display of the embodiment of FIG. 3, produced by an embodiment such as that shown in FIG. 1, now showing information associated with the upcoming waypoints without route guidance active, in accordance with the disclosure.

FIG. 3 illustrates an exemplary embodiment of an in-vehicle display, 500, of the system, and FIG. 4 is a close-up view of the display of FIG. 3. As shown, a roadmap is presented showing the roadway ahead, 610, and the current location of the vehicle, 620. In addition, a plurality of select waypoints of general interest ahead are shown, 630. Information of the waypoints is presented in a table format, 640, although other formats may also be used, for example text overlaid on or near the waypoint icons or road sections between waypoints. In FIG. 4, the name of the waypoints and estimated time to arrival (ETA) at the waypoints are displayed in the table. As noted at the top of the table, no route guidance is active, or in other words, no destination was input into the system by the driver, and none was used to determine the select waypoints or associated information.

Figure 5:
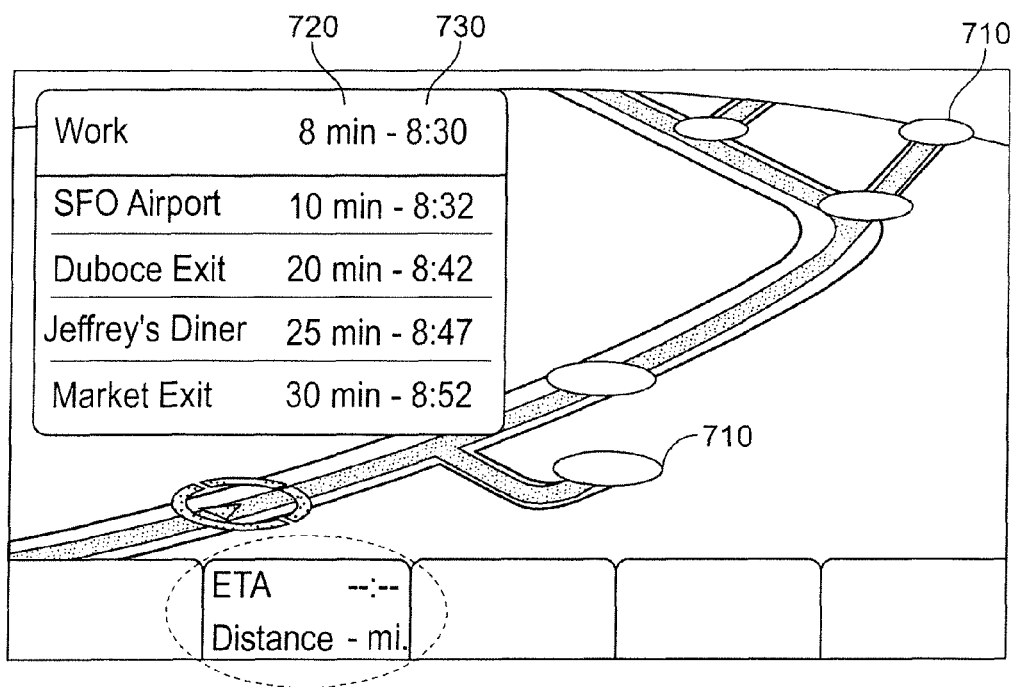
FIG. 5 is an illustrative displayed roadmap similar in area and scale to the roadmap shown in FIG. 4, now showing further information of upcoming waypoints, including points not on the road ahead but easily accessible from it, in accordance with the disclosure.

FIG. 5 illustrates a more inclusive display of waypoints and associated information, showing the same roadway as in FIG. 4. As shown, additional waypoints 710 are shown which, although not located on the road ahead, are accessible from it. Furthermore, the table of information now displays both the ETA, 720, and the time of day the waypoints are estimated to be reached, 730. The level of detail may be modified in accordance with preferences input into the system by the driver, for example using a touch-screen input and virtual keyboard. Alternatively, the additional waypoints may have been recognized as frequently visited destinations by the system, and automatically added to the display. As indicated by the information in the dashed oval, no destination information has been provided by the driver.

Figure 6:
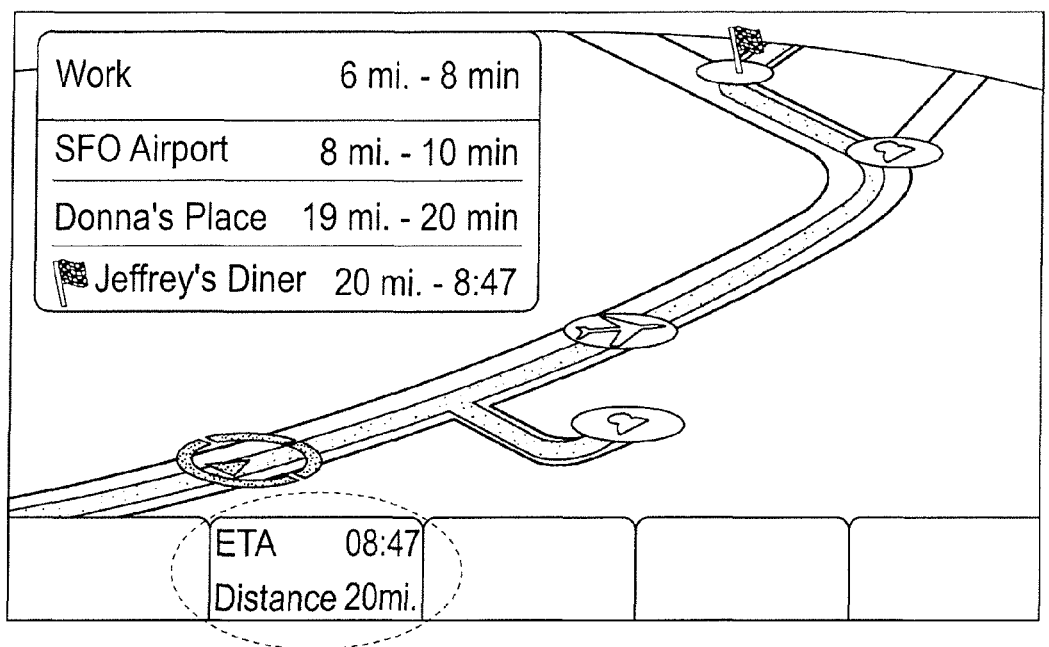
FIG. 6 is an illustrative displayed roadmap similar in area and scale to the display shown in FIGS. 4 and 5, now presenting waypoints and associated icons selected based on driver preferences and/or previously visited destinations, and with route guidance active, in accordance with the disclosure.

FIG. 6 shows a display similar to that of FIG. 5, but now including a modified selection of waypoints, presented using icons indicative of a characteristic of each waypoint. As before, the display may have been modified in accordance with input driver preferences, and/or with waypoints recognized by the system as the most frequently visited destinations ahead. In addition, as indicated by the information in the dashed oval, a destination has indeed been entered by the driver (Jeffrey's Diner), and a navigation system is now active showing the distance to Jeffrey's Diner and an estimated time of arrival there. Thus, the system may display waypoints and associated information whether or not a navigation system is active.

Figure 7:
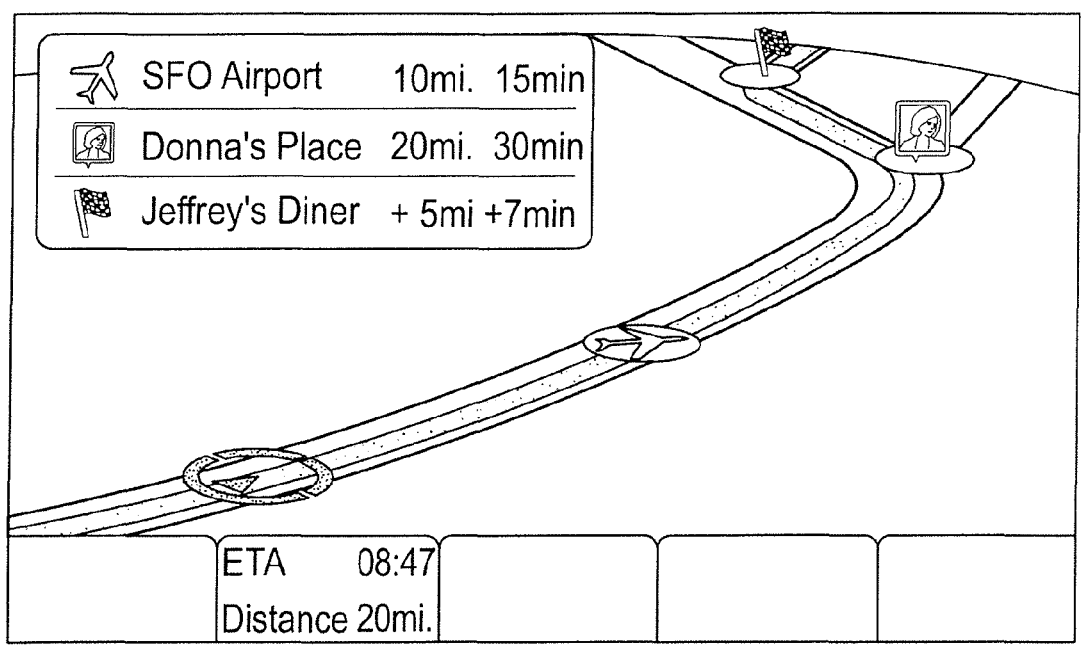
FIG. 7 is an illustrative displayed roadmap similar in area and scale to the display shown in FIG. 6, showing an alternative presentation format that includes an icon generated from a photograph obtained from an external source, and including incremental distance and travel time from one waypoint to another, in accordance with the disclosure.

FIG. 7 illustrates a different presentation of waypoint information, now showing a photograph of a person associated with "Donna's Place", and also showing the incremental distance and travel time from "Donna's Place" to Jeffrey's Diner. The incremental time (7 min) is included in the table, and is also overlaid on the line representing the portion of the roadway between those two waypoints. The photograph may have been obtained by inputting it directly into the system by the driver, for example using a smart phone in data communication with the system. Alternatively, the photograph may have been obtained by the system by accessing the driver's contact list on a smart phone, or by remotely accessing a social network account of the driver, such as a facebook page or the like.

In embodiments, upcoming traffic conditions and other events affecting traffic such as construction, accidents, fog areas, and the like along the road ahead may be retrieved from remote data sources, and displayed on the roadmap. For example, an accident site may be used as a waypoint, and/or traffic information associated with the accident may be used to calculate the travel time to upcoming waypoints. Such information may be obtained from one or more local broadcasts and/or from sources of data maintained online, for example.

In embodiments, audio, visual, and/or tactile elements may be accessible to or included in and used by the system to communicate information to the driver. As noted, the system may use one or more sensors, such as motion sensors, microphones, cameras, and the like, to obtain driver information, which may be used to infer driver stress and the like. Such information may be used by the system to modify the number of waypoints displayed or to otherwise modify the display accordingly, e.g., by introducing different waypoints, increasing or decreasing the number and/or size of waypoint display icons, and the like.

Advantages of the herein disclosed apparatus, systems, and methods include the clear presentation of estimated distance, travel time, and/or arrival time to upcoming waypoints, including locations deemed relevant to the driver based on driving history and/or preferences. In the prior art, a driver must deduce such information from other sources of information, if at all. In this way, the disclosure provides information similar to that provided by infrastructure-based roadway message signs, but without limitations as to where, when, and how the information of upcoming waypoints is presented to the driver. In the broadest terms, the system can make use of virtually any abstraction of information and format regarding upcoming waypoints, for display on virtually any display available for viewing by the user, with or without a destination input into the system by the user, and with or without route guidance being active or even available.

Disclosed embodiments can also highlight or display aspects of road segments between waypoints. The disclosed embodiments may also be effective to remind the driver of familiar places and destinations, such as the house of a friend, even if a place has not been visited in quite a long time and the route to a destination has been forgotten. The disclosed embodiments can also be used to improve a driver's time and distance perception of an area being traversed, and to improve familiarity with the distances and/or travel times to various waypoints and destinations. The selection of waypoints to be displayed, and aspects of the display of the waypoints can be modified and personalized, automatically and/or in conjunction with preference information provided by a user.

Over time, the disclosed embodiments may automatically change the selection of waypoints selected for display to pertain in particular to a driver's daily commute, and/or regular stops on a regularly traveled route. The disclosed embodiments may, for example, remove from the displayed waypoints one or more points of general interest such as intersections, and can add to the displayed waypoints stopover points or destinations previously visited by the user.

Moreover, the disclosed apparatus, systems, and methods may be used to break down a long road trip into time or distance sections of a preferred length. For example, a user may input a distant destination into a conventional navigation system, and input into the disclosed system a preference to show waypoints that include rest stops with toilet facilities at intervals of one hour of travel time along the way. In addition, the disclosed embodiments may interface with social online networks to obtain personalized waypoint information and images. Further, the disclosed embodiments may make use of locations of social network check-in services and the like such as, but not limited to, places identified in Facebook, Foursquare, or Yelp as waypoints.

Although certain embodiments have been described and illustrated in exemplary forms with a certain degree of particularity, it is noted that the description and illustrations have been made by way of example only. Numerous changes in the details of construction, combination, and arrangement of parts and operations may be made. Accordingly, such changes are intended to be included within the scope of the disclosure, the protected scope of which is defined by the claims.

The invention claimed is:

1. An in-vehicle system for presenting information of upcoming waypoints, comprising:
   a processor in data communication with:
      a graphical display device;
      a speedometer;
      a transceiver operative to communicate with at least one source of road information;
      a global positioning system (GPS) module; and
      a non-transitory data storage device on which is stored computer code which, when executed on the processor, implements:
   a database that stores information of roads and waypoints of general interest, routes previously travelled by the vehicle, and destinations previously visited by the vehicle; and
   instructions which, when executed on the processor, cause the system to:
      obtain a speed of the vehicle;
      obtain a geographic position of the vehicle;
      determine a direction of travel of the vehicle;
      identify a road being traversed by the vehicle and upcoming waypoints on the road in the direction of travel;
      request current information of upcoming road conditions on the road being traversed, and receive the requested information;
      select upcoming waypoints on the road being travelled for presentation on the display;
      determine a distance between a current location and the select waypoints;
      calculate an estimated time to arrival (ETA) from the current position to the select waypoints based on the current speed and upcoming road conditions; and
      present on the display a roadmap indicating the current location, the select waypoints, and the ETA to the select waypoints; and
   means for determining the previously travelled routes and previous destinations; and
   means for adapting the selecting of waypoints based on at least one of the previously travelled routes and previous destinations, the speed of the vehicle, and the upcoming road conditions,
   wherein the system is configured to select and present waypoints when route guidance is inactive, and
   wherein the route guidance is inactive when a destination is not set and used to determine the selected upcoming waypoints.

2. The system of claim 1, further comprising at least one sensor operative to detect a current state of the driver, wherein the driver state is used in the selection of the waypoints to display, wherein the driver state includes a stressed or agitated state.

3. The system of claim 1, further comprising a clock, wherein the time of day is used in the selection of the waypoints to display.

4. The system of claim 1, wherein the upcoming road conditions include a characterization of the area the road passes through, wherein the area characterization is used in the selection of the waypoints to display.

5. The system of claim 1, further comprising at least one source of weather condition information, wherein the weather condition is used in calculating the ETA from the current location to the select waypoints.

6. The system of claim 1, further comprising means to prompt the driver for driver preference information, wherein the driver preference information is used in the selection of the waypoints to display, wherein the preference information includes at least a preference for one or more classes of waypoints.

7. An in-vehicle system for presenting information of upcoming waypoints, comprising:
a processor in data communication with:
  a graphical display device operative to present a map that includes a road being traversed by the vehicle, select waypoints, and an estimated time to arrival (ETA) at the select waypoints;
  a speedometer operative to measure and output a speed of the vehicle;
  a transceiver operative to communicate with at least one source of road information;
  a global positioning system (GPS) module operative to determine a geographic location of the vehicle; and
  a non-transitory data storage device on which is stored computer code which, when executed on the processor, implements:
a database that stores information of roads and waypoints of general interest;
a waypoint selection engine operative to select upcoming ones of the stored waypoints for presentation on the display device based on the road being traversed by the vehicle; and
instructions which, when executed on the processor, cause the system to:
  obtain a speed of the vehicle from the speedometer;
  obtain a geographic position of the vehicle from the GPS module;
  determine a direction of travel of the vehicle based on information obtained from the GPS module;
  identify the road being traversed by the vehicle and upcoming waypoints on the road in the direction of travel based on the position of the vehicle and the stored roads information;
  select by the waypoint selection engine upcoming waypoints on the road being travelled for presentation on the display;
  determine a roadway distance between the current location and the select waypoints;
  calculate an estimated time to arrival (ETA) from the current location to the select waypoints based on the distance to the waypoints and the road speed limits obtained from the database;
  present on the display the map indicating a current location, the select waypoints, and at least one of the ETA to the select waypoints and the roadway distance to the select waypoints; and
  continuously or periodically refresh the display with updated information
    wherein the system is configured to select and present waypoints when route guidance is inactive, and
    wherein the route guidance is inactive when a destination is not set and used to determine the selected upcoming waypoints.

8. The system of claim 7, wherein the stored instructions when executed on the processor further cause the system to request, via the transceiver, current information of upcoming road conditions on the road(s) ahead, and to receive the requested information; and
wherein the upcoming road conditions are used in calculating the ETA.

9. The system of claim 7, wherein the stored instructions further implement a route profile engine for determining a route traveled by the vehicle and a destination visited by the vehicle, and the database stores the route and the destination.

10. The system of claim 9, wherein the database stores a plurality of routes previously traveled by the vehicle and destinations previously visited by the vehicle as additional information of roads and waypoints, respectively, and the waypoint selection engine uses at least a portion of the stored routes and the stored destinations to select upcoming ones of the stored waypoints for presentation on the display.

11. The system of claim 7, further comprising a clock operative to output the current time, wherein the instructions when executed on the processor further cause the system to present on the display an estimated time of arrival (TOA) at the select waypoints based on the current time and the ETA.

12. The system of claim 7, wherein the waypoint selection engine is operative to modify the selecting of waypoints for presentation on the display.

13. The system of claim 12, wherein the modifying the selection of waypoints is based on at least one of the speed of the vehicle, and the upcoming road conditions.

14. The system of claim 12, wherein the modifying the selection of waypoints is based on at least one of the previously travelled routes and previous destinations.

15. The system of claim 12, further comprising at least one sensor operative to detect a current state of the driver, wherein the modifying the selection of waypoints is based on the driver state, wherein the driver state includes a stressed or agitated state.

16. The system of claim 15, wherein the presentation of the select waypoints is modified based on an action of the driver.

17. The system of claim 16, wherein the action is a gesture detected by a sensor.

18. The system of claim 16, wherein the action includes a plurality of driver movements detected by the sensor.

19. The system of claim 16, wherein the action is an inputting of preference information into the system by the driver, wherein the preference information includes at least a preference for one or more classes of waypoints.

20. The system of claim 7, further comprising a clock, wherein the time of day is used in the selection of the waypoints to display.

21. The system of claim 7, wherein the upcoming road conditions include a characterization of the area the road passes through, wherein the area characterization is used in the selection of the waypoints to display.

22. The system of claim 7, further comprising at least one source of weather condition information, wherein the weather condition information is used in the calculating an estimated time to arrival (ETA) from the current location to the select waypoints.

23. The system of claim 7, wherein at least one of the waypoints is displayed as an icon representative of a characteristic or identity of the waypoint.

24. The system of claim 23, wherein the characteristic is one of a restaurant, a gas station, and an airport.

25. The system of claim 23, wherein the characteristic is a personal contact's home or workplace, and the icon is derived from a photograph.

26. A vehicle that includes the system of claim 7.

27. A method for in-vehicle presentation of information of upcoming waypoints, comprising:
  obtaining a speed of the vehicle from a speedometer;
  obtaining a geographic position of the vehicle from a GPS module;

determining a direction of travel of the vehicle based on information obtained from the GPS module;

identifying a road being traversed by the vehicle and upcoming waypoints on the road in the direction of travel based on the position of the vehicle and information on roads and waypoints retrieved from a database;

selecting upcoming waypoints for presentation on a display based on the road being travelled;

determining a distance between the current location and the select waypoints;

calculating by a processor an estimated time to arrival (ETA) from the current location to the select waypoints based on the distance to the waypoints and the speed of the vehicle;

presenting on the display a roadmap indicating a current location, the select waypoints, and at least one of: the ETA to the select waypoints, and the distance to the select waypoints; and continuously or periodically refreshing the display with updated information, wherein the system is configured to select and present waypoints when route guidance is inactive, and wherein the route guidance is inactive when a destination is not set and used to determine the selected upcoming waypoints.

28. The method of claim 27, further comprising requesting, via a transceiver, current information of upcoming road conditions on the road being traversed, and receiving the requested information; and using the upcoming road conditions in the calculating the ETA.

29. The method of claim 27, further comprising determining a route traveled by the vehicle and a destination visited by the vehicle, and storing in the database the route and the destination.

30. The method of claim 29, further comprising storing a plurality of routes previously traveled by the vehicle and destinations previously visited by the vehicle, and using at least a portion of the stored routes and the stored destinations in the selecting of upcoming ones of the stored waypoints for presentation on the display.

31. The method of claim 27, further comprising:

obtaining a current time from a timekeeping device, and presenting on the display an estimated time of arrival (TOA) at the select waypoints based on the current time and the ETA.

32. The method of claim 27, further comprising modifying the selecting of waypoints by a waypoint selection engine.

33. The method of claim 32, wherein the modifying the selection of waypoints is based at least in part on at least one of the speed of the vehicle and the upcoming road conditions.

34. The method of claim 27, further comprising detecting and storing at least one route travelled and at least one destination visited, wherein the selection of waypoints is based at least in part on at least one of the stored route(s) travelled and the stored destination(s) visited.

35. The method of claim 32, further comprising detecting a current state of the driver, wherein the selection of waypoints is modified based at least in part on the driver state, wherein the driver state includes a stressed or agitated state.

36. The method of claim 32, wherein the presentation of the select waypoints is modified based at least in part on an action of the driver.

37. The method of claim 36, wherein the action is a gesture detected by a sensor.

38. The method of claim 36, wherein the action includes a plurality of driver movements detected by a sensor.

39. The method of claim 36, further comprising obtaining preference information from a driver, and selecting the waypoints based at least in part on the preference information, wherein the preference information includes at least a preference for one or more classes of waypoints.

40. The method of claim 27, further comprising using a time of day obtained from a timekeeping device in the selection of the waypoints to display.

41. The method of claim 27, further comprising using an area characterization of an area through which the road passes in the selection of the waypoints to display.

42. The method of claim 27, further comprising using weather condition information in the calculating an estimated time to arrival (ETA) from the current location to the select waypoints.

43. The method of claim 27, wherein at least one of the waypoints is displayed as an icon representative of a characteristic or identity of the waypoint.

44. The method of claim 43, wherein the characteristic is one of a restaurant, a gas station, and an airport.

45. The method of claim 43, wherein the characteristic is a personal contact's home or workplace, further comprising deriving the icon from a photograph of the personal contact.

* * * * *